US011041573B2

(12) United States Patent
Hostetter et al.

(10) Patent No.: US 11,041,573 B2
(45) Date of Patent: Jun. 22, 2021

(54) CONTROL VALVES INCLUDING VALVE TRIM HAVING RELATIVE MOVEMENT BETWEEN THE BONNET AND THE CAGE

(71) Applicant: FISHER CONTROLS INTERNATIONAL LLC, Marshalltown, IA (US)

(72) Inventors: Steven K. Hostetter, Colfax, IA (US); Wesley T. Ohrt, Ankeny, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 89 days.

(21) Appl. No.: 16/406,531

(22) Filed: May 8, 2019

(65) Prior Publication Data
US 2020/0355289 A1  Nov. 12, 2020

(51) Int. Cl.
| | |
|---|---|
| *F16K 27/02* | (2006.01) |
| *F16K 27/08* | (2006.01) |
| *F16K 47/08* | (2006.01) |
| *F16K 27/04* | (2006.01) |
| *F16K 3/316* | (2006.01) |
| *F16K 3/24* | (2006.01) |

(52) U.S. Cl.
CPC .................. *F16K 27/02* (2013.01)

(58) Field of Classification Search
CPC ........ F16K 27/02; F16K 27/041; F16K 3/246; F16K 47/08; Y10T 137/6011; Y10T 137/7668; B23P 15/001
See application file for complete search history.

(56) References Cited

U.S. PATENT DOCUMENTS

| | | | | |
|---|---|---|---|---|
| 3,506,242 A | * | 4/1970 | Aunspach | .............. F16J 15/125 |
| | | | | 251/361 |
| 3,599,934 A | * | 8/1971 | Reed | ....................... F16K 25/00 |
| | | | | 251/303 |

(Continued)

FOREIGN PATENT DOCUMENTS

| | | | | |
|---|---|---|---|---|
| DE | | 2602577 A1 * | 7/1977 | ............. F16K 1/422 |
| JP | | S60196065 U | 12/1985 | |

OTHER PUBLICATIONS

Instruction Manual; "Fisher™ ET and EAT Easy-e™ Valves CL125 through CL600;" Nov. 2017; www.Fisher.com.

(Continued)

*Primary Examiner* — Marina A Tietjen
(74) *Attorney, Agent, or Firm* — Marshall, Gerstein & Borun LLP (57) ABSTRACT

Control valves including valve trim having relative movement between the bonnet and the cage. A control valve includes a valve body including an inlet, an outlet, and a flow passage connecting the inlet and the outlet. The control valve includes a cage disposed in the flow passage. The control valve includes a control element disposed in the flow passage and shiftable between a first position and a second position. The control valve includes a bonnet securable to the valve body and disposed adjacent the cage. The bonnet is adapted to receive a portion of the cage. The control valve includes a coupling formed between the bonnet and the cage that allows movement between the bonnet and the cage.

22 Claims, 6 Drawing Sheets

(56) References Cited

U.S. PATENT DOCUMENTS

| | | | | |
|---|---|---|---|---|
| 3,834,666 | A | * | 9/1974 | Keith ........................ F16K 1/34 |
| | | | | 251/361 |
| 4,137,934 | A | | 2/1979 | Rice et al. |
| 4,469,123 | A | * | 9/1984 | Merrill .................... F16K 43/00 |
| | | | | 137/315.11 |
| 2017/0299066 | A1 | * | 10/2017 | Hamberger ............. F16K 1/422 |
| 2018/0216745 | A1 | | 8/2018 | Gabriel et al. |

OTHER PUBLICATIONS

Instruction Manual; "Fisher™EZ easye™ Conotrol Valve;" Nov. 2017; www.Fisher.com.
U.S. Appl. No. 15/423,087, entitled; "Modular Valve Trim Assemblies for Control Valves," filed Feb. 2, 2017.
International Search Report and Written Opinion for PCT/US2020/027053, dated Jul. 3, 2020.

* cited by examiner

CONTROL VALVES INCLUDING VALVE TRIM HAVING RELATIVE MOVEMENT BETWEEN THE BONNET AND THE CAGE

FIELD OF THE DISCLOSURE

The present patent relates generally to control valves and, in particular, to control valves including valve trim having relative movement between the bonnet and the cage.

BACKGROUND

Known control valves include numerous trim components that are individually positioned within a valve body when the control valve is being assembled. As a result, tolerance stack-ups must be accounted for when manufacturing and positioning the trim components within the valve body. Moreover, proper alignment of the trim components is required to ensure proper seating of the valve plug against the seat ring to shut-off fluid flow through the control valve.

SUMMARY

In accordance with a first example, a control valve includes a valve body includes an inlet, an outlet, and a flow passage connecting the inlet and the outlet. The control valve includes a cage disposed in the flow passage and including an external groove. The control valve includes a control element disposed in the flow passage and shiftable between a first position and a second position. The control valve includes a bonnet securable to the valve body and disposed adjacent the cage. The bonnet includes an internal groove and having a portion that engages a portion of the cage. The external groove of the cage and the internal groove of the bonnet are positioned adjacent one another when the portion of the bonnet engages the portion of the cage. The control valve includes a compressible ring arranged within the internal groove and the external groove to form a coupling between the bonnet and the cage. The coupling allowing movement between the bonnet and the cage.

In accordance with a second example, a valve trim subassembly for use with a valve body includes an inlet, an outlet, and a flow passage connecting the inlet and the outlet. The valve trim subassembly includes a cage disposable in the flow passage and includes an external groove. The valve trim subassembly includes a bonnet securable to the valve body and disposed adjacent the cage. The bonnet includes an internal groove and having a portion that engages a portion of the cage. The external groove of the cage and the internal groove of the bonnet are positioned adjacent one another when the portion of the bonnet engages the portion of the cage. The valve trim subassembly includes a compressible ring arranged within the internal groove and the external groove to form a coupling between the bonnet and the cage. The coupling allowing movement between the bonnet and the cage.

In accordance with a third example, a control valve includes a valve body including an inlet, an outlet, and a flow passage connecting the inlet and the outlet. The control valve includes a cage disposed in the flow passage and a control element disposed in the flow passage and shiftable between a first position and a second position. The control valve includes a bonnet securable to the valve body and disposed adjacent the cage. The bonnet is adapted to receive a portion of the cage. The control valve includes a coupling formed between the bonnet and the cage that allows movement between the bonnet and the cage.

In accordance with a fourth example, a method of producing a valve trim subassembly for use with a valve body, the method includes providing a cage including an external groove; positioning a compressible ring within the external groove; providing a bonnet including an internal groove; engaging a portion of the bonnet with a portion of the cage; and positioning the compressible ring within the internal groove of the bonnet to form a coupling between the cage and the bonnet. The coupling allowing movement between the cage and the bonnet.

In further accordance with the foregoing first, second, third and/or fourth examples, an apparatus and/or method may further include any one or more of the following:

In accordance with one example, the portion of the cage includes an outward facing step. The outward facing step is disposed adjacent the bonnet.

In accordance with another example, the step forms a space. The portion of the bonnet includes the internal groove and is disposed within the space formed by the step.

In accordance with another example, further including a seal. The seal is positioned on a surface of the step. The seal is arranged to be compressed between the bonnet and the surface of the step of the cage.

In accordance with another example, a height of the external groove is less than a height of the internal groove. The compressible ring is disposed within the external groove and movable within the internal groove to provide the coupling.

In accordance with another example, the seal is a spiral-wound gasket.

In accordance with another example, a height of the external groove is greater than a height of the internal groove. The compressible ring is disposed within the internal groove and is movable within the external groove to provide the coupling.

In accordance with another example, the portion of the cage includes an outward-facing tapered surface. The compressible ring is sized to cooperate with the outward-facing tapered surface to expand the compressible ring when the compressible ring is being positioned within the external groove.

In accordance with another example, the portion of the bonnet includes an inward-facing tapered surface. The compressible ring is sized to corporate with the inward-facing tapered surface to compress the compressible ring when the compressible ring is being positioned within the internal groove.

In accordance with another example, the internal groove of the bonnet includes a second inward-facing tapered surface. The second inward-facing tapered surface is arranged to compress the compressible ring when the compressible ring is being removed from the internal groove.

In accordance with another example, further including a plug guide carried by the cage and adapted to guide movement of the control element.

In accordance with another example, the cage includes an internal groove and an internal step. The internal step is engaged by the plug guide. Further including a second fastener arranged within the internal groove of the cage. The second fastener engaging a surface of the plug guide to couple the plug guide to the cage.

In accordance with another example, further including a control element disposed in the cage.

In accordance with another example, the portion of the bonnet includes the internal groove and is disposed within a space formed by the step.

In accordance with another example, further including a control element and a plug guide. The plug guide carried by the cage and adapted to guide movement of the control element.

In accordance with another example, the bonnet includes an internal groove and the cage includes an external groove. Further including a compressible ring arranged within the internal groove and the external groove to form the coupling.

In accordance with another example, the portion of the cage includes an outward-facing tapered surface and positioning the compressible ring within the external groove includes engaging the compressible ring against the outward-facing tapered surface to allow the compressible ring to cooperate with the outward-facing tapered surface to expand the compressible ring.

In accordance with another example, the portion of the bonnet includes an inward-facing tapered surface and positioning the compressible ring within the internal groove of the bonnet includes engaging the compressible ring against the inward-facing tapered surface to allow the compressible ring to cooperate with the inward-facing tapered surface to compress the compressible ring when the compressible ring is being positioned within the internal groove.

In accordance with another example, further including providing a control element and a plug guide adapted to guide movement of the control element. The method includes disposing the control element within the cage and coupling the plug guide to the cage.

In accordance with another example, the cage includes an internal groove and an internal step, further including providing a second fastener and engaging the plug guide and the internal step and disposing the second fastener within the internal groove. The fastener engaging a surface of the plug guide to couple the plug guide to the cage.

DETAILED DESCRIPTION

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Figure 1:
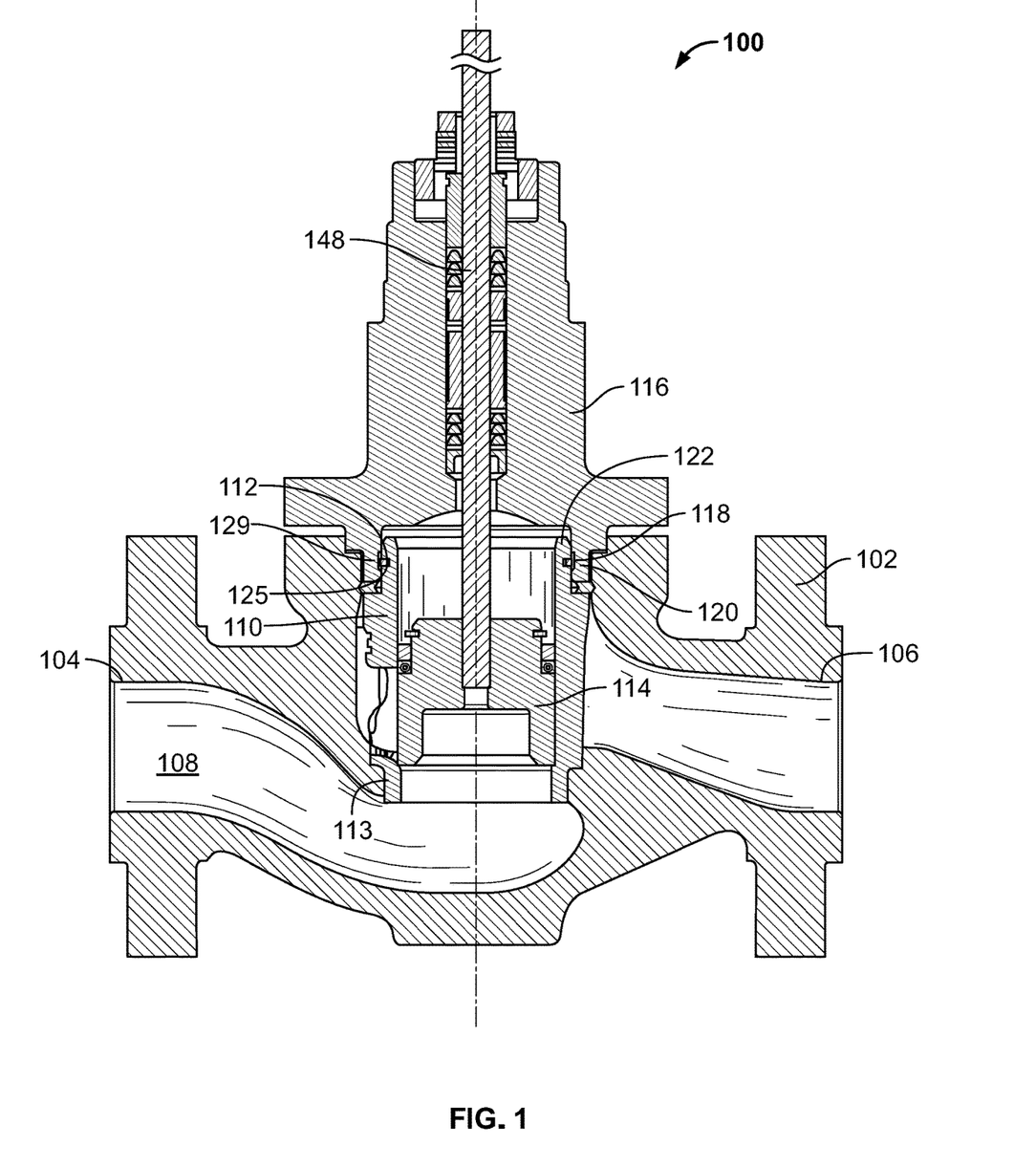
FIG. 1 is a cross-sectional view of a control valve assembled in accordance with the teachings of a first disclosed example of the present invention and including a valve body having an inlet, an outlet, a flow passage connecting the inlet and the outlet, and a valve trim subassembly having a cage, and a coupling provided between the cage and a bonnet to allow movement between the cage and the valve bonnet.

Referring now to the drawings, FIG. 1 illustrates a control valve 100 in accordance with the teachings of a first disclosed example of the present invention. The control valve 100 includes a valve body 102 having an inlet 104, an outlet 106 and a flow passage 108 connecting the inlet 104 and the outlet 106. The control valve 100 includes a cage 110 disposed in the flow passage 108.

Figure 2:
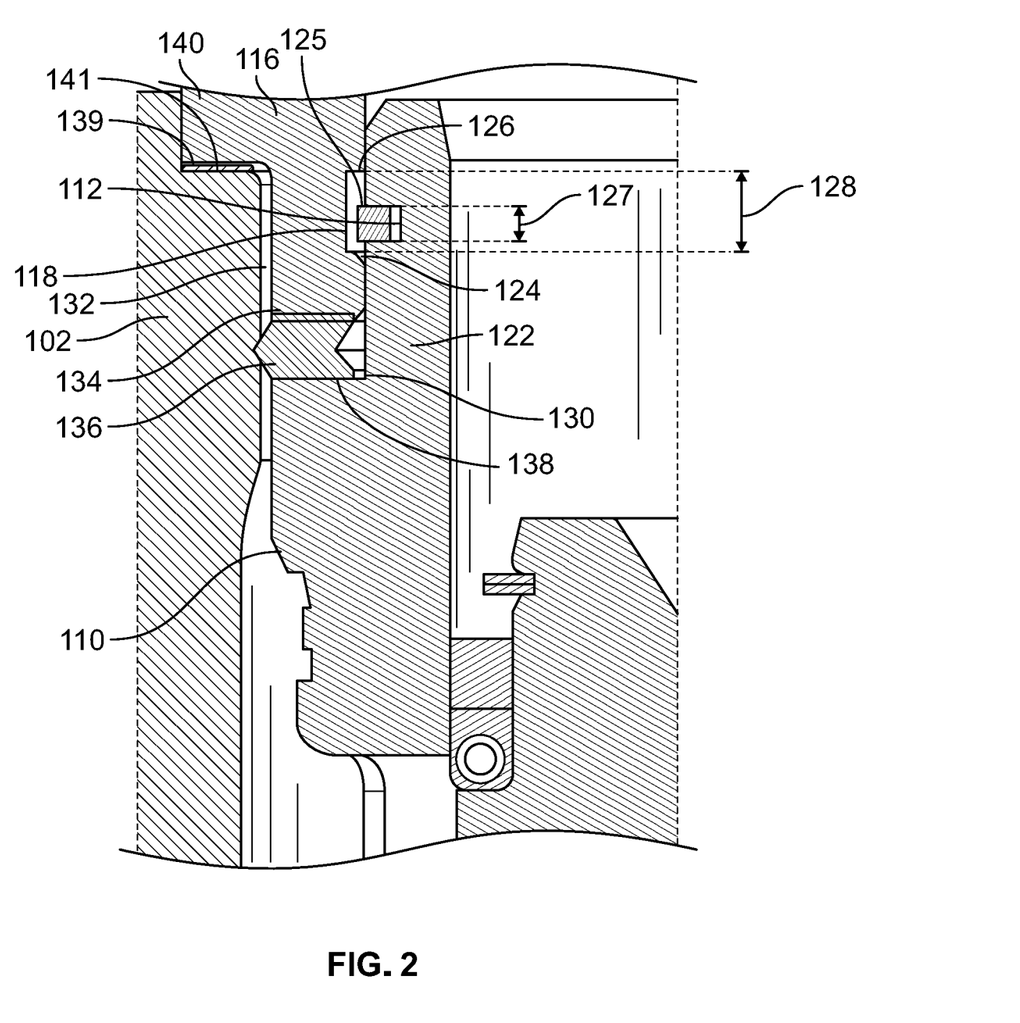
FIG. 2 is an enlarged fragmentary cross-sectional view illustrating portions of the cage, the valve bonnet and aspects of the coupling between the cage and the valve bonnet.

The cage 110 includes an external groove 112 (the external groove 112 is best shown in FIG. 2). The external groove 112 has a square cross-section that may form an interference fit with a compressible ring 125 that is discussed in more detail below. Alternatively, the external groove 112 may have another cross-section (e.g., rectangular). In the example shown, the cage 110 also includes an integral seat 113.

Figure 4:
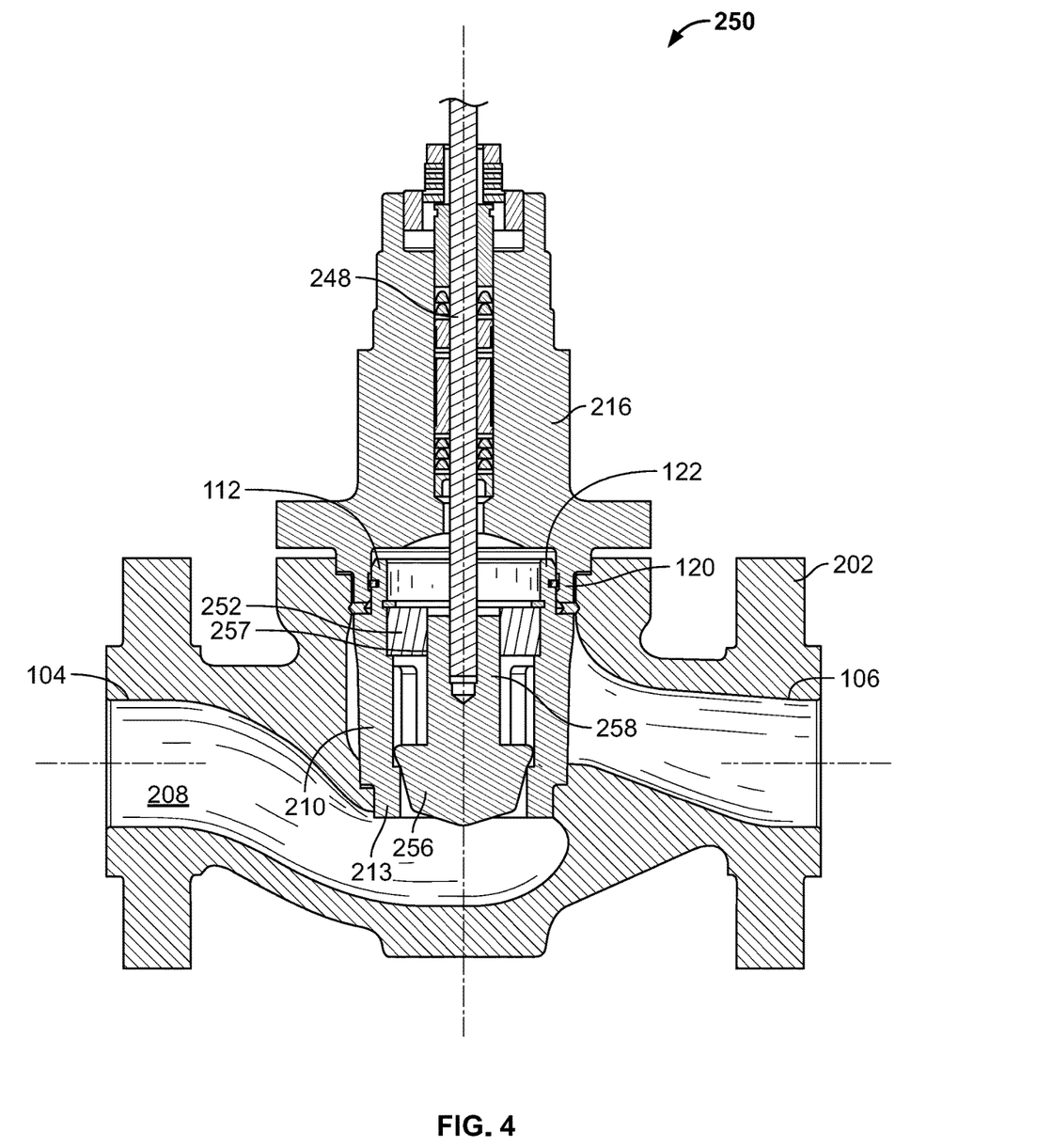
FIG. 4 is a cross-sectional view of a control valve assembled in accordance with the teachings of a second disclosed example of the present invention and including a valve body having an inlet, an outlet, a flow passage connecting the inlet and the outlet, and a valve trim subassembly having a plug guide.
Figure 5:
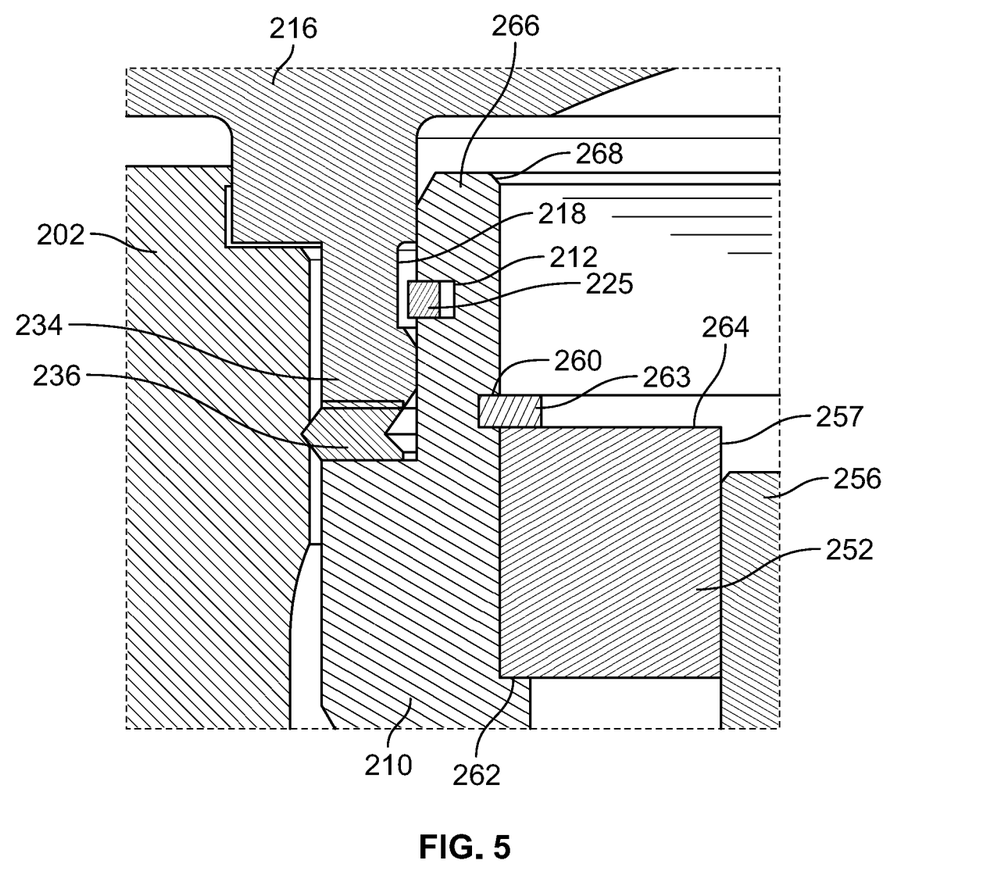
FIG. 5 is an enlarged fragmentary cross-sectional view illustrating portions of the cage, the valve bonnet and aspects of a coupling between the cage and the plug guide.

A control element 114 is disposed in the flow passage 108 and is shiftable between a first position and a second position. The first position may be associated with the control element 114 being spaced from the seat 113 allowing fluid flow through the flow passage 108. The second position may be associated with the control element 114 engaging the seat 113 preventing fluid flow through the flow passage 108. In the example shown, the control element 114 is a pressure balanced valve plug. However, alternatively and as shown in FIGS. 4 and 5, the control element 114 may be an unbalanced valve plug.

As shown in FIG. 1, a bonnet 116 is securable to the valve body 102 and disposed adjacent the cage 110. The bonnet 116 includes an internal groove 118 (the internal groove 118 is best shown in FIG. 2). The internal groove 118 has a rectangular cross-section. However, other cross-sections may be used instead (e.g., semi-circular groove).

When the bonnet 116 receives the cage 110 as shown, a portion 120 of the bonnet 116 engages a portion 122 of the cage 110 and the external groove 112 of the cage 110 is positioned adjacent the internal groove 118 of the bonnet 116. The portion 120 of the bonnet 116 is shown as a stepped-annular projection that matingly engages corresponding structure of the valve body 102. The portion 122 of the cage 110 is shown as an annular projection. The grooves 112, 118 being adjacent one another may include having the grooves 112, 118 face one another, being radially aligned and/or at least partially overlapping. For example, having the grooves 112, 118 positioned adjacent one another can include the external groove 112 being positioned between ends 124, 126 (the ends 124, 126 are best seen in FIG. 2) of the internal groove 118 allowing for the compressible ring 125 to extend between the grooves 112, 118 as shown.

The compressible ring 125 (the compressible ring 125 is best shown in FIG. 2) is arranged within the internal groove 118 and the external groove 112 to form a coupling 129 between the bonnet 116 and the cage 110. The coupling 129 allows movement between the bonnet 116 and the cage 110. Thus, the compressible ring 125 forms a non-rigid connection between the bonnet 116 and the cage 110. The compressible ring 125 may be a snap ring or another type of fastener.

FIG. 2 illustrates a detailed view of the control valve 100 of FIG. 1. In the example shown, a height 127 of the external groove 112 is less than a height 128 of the internal groove 118. As a result, the compressible ring 125 may be disposed within the external groove 112 and can be movable within the internal groove 118. For example, an interference fit may be formed between the compressible ring 125 and the external groove 112 that secures the compressible ring 125 within the external groove 112. Alternatively, a height of the internal groove 118 may be less than a height of the external groove 112 (see, for example, FIG. 6). In such examples, the compressible ring 125 may be disposed within the internal groove 118 and may be movable within the external groove 112. Regardless of the relative heights of the external groove 112 and the internal groove 118, the ability of the cage 110 and the bonnet 116 to be movably coupled to one another accommodates for differences in thermal expansion rates of the valve body 102, the cage 110 and/or the bonnet 116. Moreover, movably coupling the cage 110 and the bonnet 116 allows this valve trim subassembly to be relatively easily installed within the valve body 102 with reduced alignment issues. The valve trim subassembly may include two or more of the cage 110, the control element 114 and the bonnet 116.

As shown in FIG. 2, the portion 122 of the cage 110 has an outward-facing step 130 disposed adjacent the bonnet 116. The step 130 forms a space 132 in which a portion 134 of the bonnet 116 is positioned. The internal groove 118 is formed on the portion 134 of the bonnet 116, which is shown having a substantially rectangular cross-section.

A seal 136 is positioned on a surface 138 of the step 130 and is arranged to be compressed between the bonnet 116 and the surface 138 of the step 130. When the relative position of the cage 110, the bonnet 116 or the valve body 102 changes, the seal 136 may continue to sealingly engage the cage 110 and the bonnet 116. Thus, regardless of the relative position between the cage 110 and the bonnet 116, a seal may continue to be provided between the cage 110 and the bonnet 116 and/or between the cage 110, the bonnet 116 and the valve body 102. In the example shown, the seal 136 is a spiral-wound gasket. However, the seal 136 may be any other type of seal. Another seal 139 is positioned between a shoulder 140 of the bonnet 116 and a stepped-surface 141 of the valve body 102. The seal 139 may prevent fluid flow between the valve body 102 and the bonnet 116. The seal 139 is shown as a shim gasket or a bonnet gasket. However, other types of seals may alternatively be used.

Figure 3:
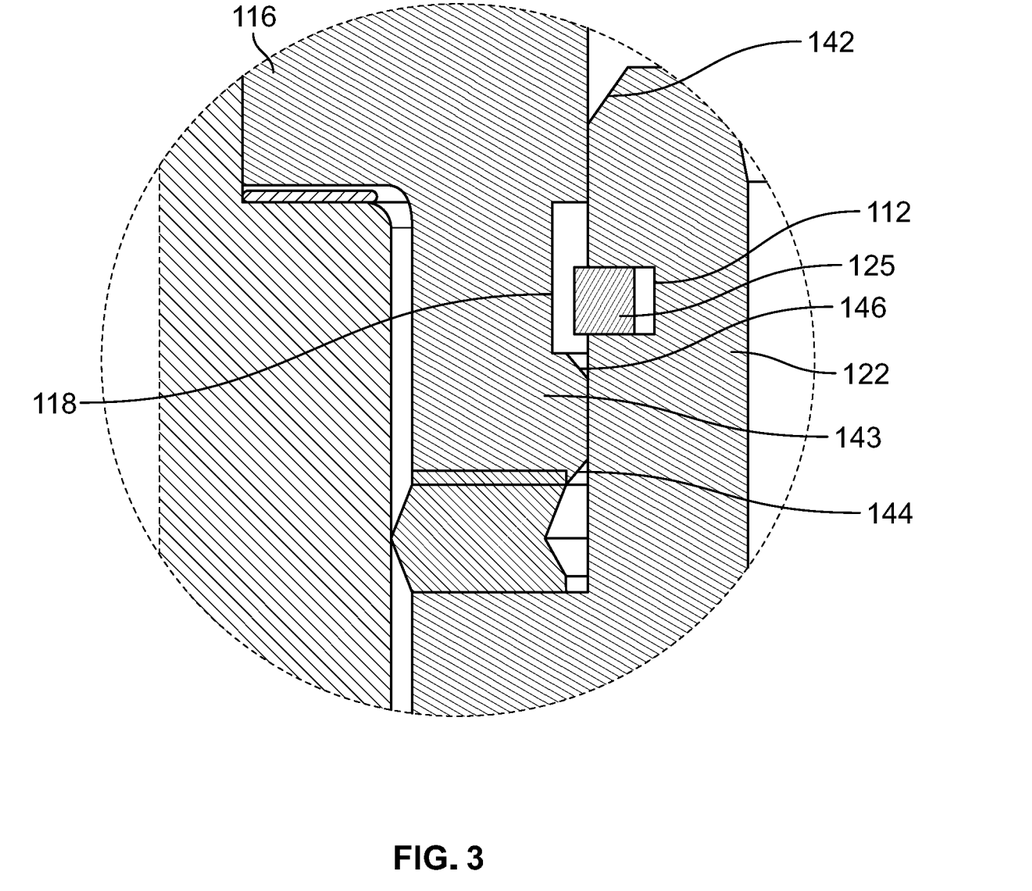
FIG. 3 is similar to FIG. 2 but is a further enlarged fragmentary view illustrating aspects of the coupling between the cage and the valve bonnet.

FIG. 3 illustrates another detailed view of the control valve 100 of FIG. 1. In the example shown, the portion 122 of the cage 110 has an outward-facing tapered surface 142 and a portion 143 of the bonnet 116 has an inward-facing tapered surface 144. Angles of one or more of the surfaces 142, 144 is approximately 30°. However, the angle of the respective surfaces 142, 144 may be any other angle.

When the compressible ring 125 is being positioned within the external groove 112, the compressible ring 125 is sized to cooperate with the tapered surface 142 to expand the compressible ring 125. Specifically, when the compressible ring 125 is being positioned about the cage 110 and the compressible ring 125 engages the tapered surface 142, the compressible ring 125 is expanded (the diameter is increased). When the compressible ring 125 carried by the cage 110 is being positioned within the internal groove 118, the compressible ring 125 is sized to cooperate with the tapered surface 144 to compress compressible ring 125 (the diameter is decreased). In the compressed state, the compressible ring 125 and the cage 110 may be further positioned within the bonnet 116 until the compressible ring 125 is radially aligned with the internal groove 118, thereby allowing the compressible ring 125 to move toward an expanded state and be received within the internal groove 118. When the compressible ring 125 is received within the groove 112, 118, the cage 110 and the bonnet 116 are movably coupled together (e.g., coupled in a manner that allows movement between the cage 110 and the bonnet 116).

As shown in FIG. 3, the internal groove 118 has a second inward-facing tapered surface 146. An angle of the tapered surface 146 is approximately 60°. However, the tapered surface 146 may be formed at any other angle. When the compressible ring 125 is being removed from the internal groove 118, the second inward-facing tapered surface 146 is arranged to compress the compressible ring 125. Specifically, if a valve stem 148 (the valve stem 148 is best shown in FIG. 1) of the control valve 100 is struck with a hammer, the control element 114 is driven against the seat 113, causing the seat 113, the cage 110 and the compressible ring 125 within the external groove 112 to move downward. As the compressible ring 125 moves downward, the compressible ring 125 engages the tapered surface 146 and is compressed. When the compressible ring 125 is compressed by the tapered surface 146, the compressible ring 125 is removable from the internal groove 118 and the cage 110 may be uncoupled from the bonnet 116.

FIG. 4 illustrates a control valve 250 in accordance with the teachings of a second disclosed example of the present invention. Elements of the control valve 250 which are the same or similar to the control valve 100 are designated by the same reference numeral, incremented by 100. A description of many of these elements is abbreviated or eliminated in the interest of brevity.

The control valve 250 is similar to the control valve 100 of FIG. 1. However, in contrast to the control valve 100 of FIG. 1, the control valve 200 of FIG. 4 includes a plug guide 252 carried by the cage 210. The plug guide 252 guides the movement of a control element 256 relative to the valve seat 213. The valve seat 213 is integral to the cage 210. To guide movement of the control element 256, the plug guide 252 includes an aperture 257 that receives a portion 258 of the control element 256. As a result of the interaction between the portion 258 of the control element 256 and the aperture 257 of the plug guide 252, the control element 256 is guided relative to the valve seat 213. The control element 256 is an unbalanced valve plug. However, other types of valve plugs may be used.

FIG. 5 illustrates a detailed view of the control valve 250 of FIG. 4. In the example shown, the cage 210 includes an internal groove 260 and an internal step 262. A fastener 263 is received within the internal groove 260. The fastener 263 may be a compressible ring such as a snap ring or a retaining ring. The plug guide 252 engages the internal step 262 and is captured between the internal step 262 and the fastener 263 to couple the plug guide 252 to the cage 210. Specifically, the fastener 263 projects from the internal groove 260 and engages a surface 264 of the plug guide 252. In the example shown, a portion 266 of the cage 210 includes an outward-facing tapered surface 268. When the fastener 263 is being positioned within the internal groove 260, the tapered surface 268 is arranged to compress the fastener 263.

Figure 6:
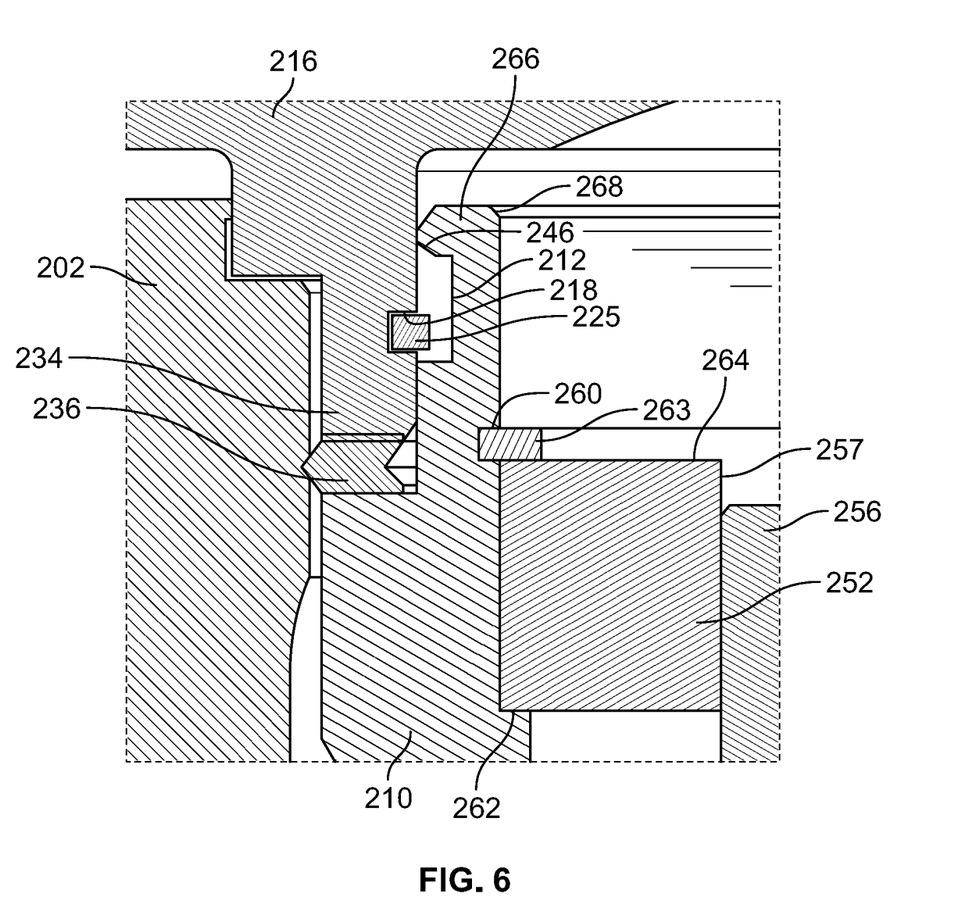
FIG. 6 is an enlarged fragmentary cross-sectional view illustrating portions of the cage, the valve bonnet and aspects of an alternative coupling between the cage and the plug guide.

FIG. 6 illustrates a detailed view of the control valve 250 of FIG. 4 having an alternative coupling between the cage 210 and the bonnet 216. In contrast to the examples shown above, a height of the internal groove 218 of the bonnet 116 is less than a height of the external groove 212 of the cage 210. Thus, the compressible ring 225 is disposed within the internal groove 218 and is movable within the external groove 212. Also, the external groove 212 includes the tapered surface 246. The tapered surface 246 is positioned to allow the compressible ring 225 to be compressed when, for example, the valve stem 148 (the valve stem 148 is best shown in FIG. 1) of the control valve 100 is struck with a hammer to remove the compressible ring 225 from the external groove 212.

From the foregoing, it will be appreciated that the above disclosed apparatus, methods and articles of manufacture enable control valves to be produced with less tolerance variances, reducing the likelihood of leaks occurring. Specifically, tolerance variances are reduced using the teachings of this disclosure by forming a cage with an integral seat and coupling the cage to a bonnet using a snap ring. The coupling between the bonnet and the cage substantially ensures the relative alignment between the cage and the bonnet and forms a modular valve-trim assembly (a valve trim cartridge). As a result of the non-rigid coupling between the cage and bonnet, thermal expansion between the respective components of the control valve is allowed and machining tolerance variations between the respective control valve components may be increased. Moreover, as a result of the teachings of this disclosure, the number of parts included in the valve trim assembly is reduced and the time required to assemble such valves is reduced given that no subsequent operations are required to achieve proper alignment and sealing. The modular valve trim assembly may be formed using additive manufacturing processes, milling processes, etc.

To assemble one of the valve trim subassemblies, the valve plug and the valve stem are positioned within the cage, the spiral wound gasket is placed over top of the cage and a snap ring is positioned within a groove formed by an outer surface of the cage. When the plug is an unbalanced plug, a plug guide can be positioned within the cage. To secure the plug guide within the cage, the plug guide is captured between an internal shoulder of the cage and a fastener carried by the cage. The fastener can be a retaining ring.

To couple the valve trim assembly and the bonnet to form the modular valve trim assembly, an end of the cage carrying the snap ring is inserted into the inner diameter of the bonnet until the snap ring is received within a corresponding groove of the bonnet. The interaction between the bonnet, the cage and the snap ring forms an interference fit that couples (movably couples) the cage and the bonnet together.

Moreover, the groove formed by the bonnet is sized (e.g., has sufficient height) to allow the snap ring and the cage to shift up and down during the compression or decompression of the spiral wound gasket while allowing the cage to engage the bonnet during assembly and operation. Specifically, the coupling between the cage and the bonnet formed by the snap ring allows the spiral wound gasket positioned therebetween to expand and contract to fill the gap between the bonnet and the cage, thereby allowing the interface between the bonnet and the cage to remain sealed regardless of the relative position of the cage and the bonnet.

When the valve trim subassembly is installed into a valve body, fasteners are received through the bonnet and the valve body to couple (e.g., bolt) the valve body and the bonnet together and compress the port flat sheet graphite gasket and the spiral wound gasket at the top of the cage. The compression of the gaskets allows the cage to engage the bonnet. In contrast, if a rigid connection were formed between the bonnet and the cage such as that provided by a threaded connection, the spiral wound gasket may not be compressed or able to expand/compress when the bonnet is bolted to the valve body. As a result, an improper seal may be formed and/or components of the control valve may be overstressed.

Further, while several examples have been disclosed herein, any features from any examples may be combined with or replaced by other features from other examples. Moreover, while several examples have been disclosed herein, changes may be made to the disclosed examples within departing from the scope of the claims.

What is claimed is:

1. A control valve, comprising:
    a valve body comprising an inlet, an outlet, and a flow passage connecting the inlet and the outlet;
    a cage disposed in the flow passage and comprising an external groove;
    a control element disposed in the flow passage and shiftable between a first position and a second position;
    a bonnet securable to the valve body and disposed adjacent the cage, the bonnet comprising an internal groove and having a portion that engages a portion of the cage, the external groove of the cage and the internal groove of the bonnet positioned adjacent one another when the portion of the bonnet engages the portion of the cage; and
    a compressible ring arranged within the internal groove and the external groove to form a coupling between the bonnet and the cage, the coupling allowing movement between the bonnet and the cage,
    wherein the portion of the cage comprises an outward facing step, the outward facing step being disposed adjacent the bonnet and wherein the step forms a space, and wherein the portion of the bonnet comprises the internal groove and is disposed within the space formed by the step.

2. The control valve of claim 1, further comprising a seal, the seal positioned on a surface of the step, the seal arranged to be compressed between the bonnet and the surface of the step of the cage.

3. The control valve of claim 2, wherein a height of the external groove is less than a height of the internal groove, the compressible ring disposed within the external groove and movable within the internal groove to provide the coupling.

4. The control valve of claim 3, wherein the seal is a spiral-wound gasket.

5. The control valve of claim 2, wherein a height of the external groove is greater than a height of the internal groove, the compressible ring disposed within the internal groove and movable within the external groove to provide the coupling.

6. The control valve of claim 1, further comprising a plug guide carried by the cage and adapted to guide movement of the control element.

7. The control valve of claim 6, wherein the cage comprises an internal groove and an internal step, the internal step engaged by the plug guide, further comprising a second fastener arranged within the internal groove of the cage, the second fastener engaging a surface of the plug guide to couple the plug guide to the cage.

8. A control valve, comprising:
    a valve body comprising an inlet, an outlet, and a flow passage connecting the inlet and the outlet;
    a cage disposed in the flow passage and comprising an external groove;

a control element disposed in the flow passage and shiftable between a first position and a second position;

a bonnet securable to the valve body and disposed adjacent the cage, the bonnet comprising an internal groove and having a portion that engages a portion of the cage, the external groove of the cage and the internal groove of the bonnet positioned adjacent one another when the portion of the bonnet engages the portion of the cage; and a compressible ring arranged within the internal groove and the external groove to form a coupling between the bonnet and the cage, the coupling allowing movement between the bonnet and the cage, wherein the portion of the cage comprises an outward-facing tapered surface, the compressible ring is sized to cooperate with the outward-facing tapered surface to expand the compressible ring when the compressible ring is being positioned within the external groove.

9. The control valve of claim 8, wherein the portion of the bonnet comprises an inward-facing tapered surface, the compressible ring is sized to cooperate with the inward-facing tapered surface to compress the compressible ring when the compressible ring is being positioned within the internal groove.

10. The control valve of claim 9, wherein the internal groove of the bonnet comprises a second inward-facing tapered surface, the second inward-facing tapered surface arranged to compress the compressible ring when the compressible ring is being removed from the internal groove.

11. A valve trim subassembly for use with a valve body comprising an inlet, an outlet, and a flow passage connecting the inlet and the outlet, the valve trim subassembly comprising:

a cage disposable in the flow passage and comprising an external groove;

a bonnet securable to the valve body and disposed adjacent the cage, the bonnet comprising an internal groove and having a portion that engages a portion of the cage, the external groove of the cage and the internal groove of the bonnet positioned adjacent one another when the portion of the bonnet engages the portion of the cage, wherein the portion of the cage comprises an outward facing step, the outward facing step disposed adjacent the bonnet;

a compressible ring arranged within the internal groove and the external groove to form a coupling between the bonnet and the cage, the coupling allowing movement between the bonnet and the cage; and a seal positioned on a surface of the step, the seal arranged to be compressed between the bonnet and the surface of the step of the cage.

12. The valve trim subassembly of claim 11, further comprising a control element disposed in the cage.

13. The valve trim subassembly of claim 11, wherein the portion of the bonnet comprises the internal groove and is disposed within a space formed by the step.

14. The valve trim subassembly of claim 11, wherein a height of the external groove is less than a height of the internal groove, the compressible ring disposed within the external groove and movable within the internal groove to provide the coupling between the bonnet and the cage.

15. The valve trim subassembly of claim 11, wherein the portion of the cage comprises an outward-facing tapered surface, the compressible ring is sized to cooperate with the outward-facing tapered surface to expand the compressible ring when the compressible ring is being positioned within the external groove.

16. The valve trim subassembly of claim 15, wherein a portion of the bonnet comprises an inward-facing tapered surface, the compressible ring is sized to cooperate with the inward-facing tapered surface to compress the compressible ring when the compressible ring is being positioned within the internal groove.

17. The valve trim subassembly of claim 16, wherein the internal groove of the bonnet comprises a second inward-facing tapered surface, the second inward-facing tapered surface arranged to compress the compressible ring when the compressible ring is being removed from the internal groove.

18. The valve trim subassembly of claim 11, further comprising a control element and a plug guide, the plug guide carried by the cage and adapted to guide movement of the control element.

19. A control valve, comprising:

a valve body comprising an inlet, an outlet, and a flow passage connecting the inlet and the outlet;

a cage disposed in the flow passage;

a control element disposed in the flow passage and shiftable between a first position and a second position;

a bonnet securable to the valve body and disposed adjacent the cage, the bonnet adapted to receive a portion of the cage; and a coupling formed between the bonnet and the cage that allows movement between the bonnet and the cage, wherein the bonnet comprises an internal radial groove and the cage comprises an external radial groove that faces and at least partially overlaps the internal radial groove, further comprising a compressible ring arranged within the internal radial groove and the external radial groove to form the coupling.

20. A method of producing a valve trim subassembly for use with a valve body, the method comprising:

providing a cage comprising an external groove;

positioning a compressible ring within the external groove;

providing a bonnet comprising an internal groove;

engaging a portion of the bonnet with a portion of the cage;

positioning the compressible ring within the internal groove of the bonnet to form a coupling between the cage and the bonnet, the coupling allowing movement between the cage and the bonnet;

providing a control element and a plug guide adapted to guide movement of the control element; and disposing the control element within the cage and coupling the plug guide to the cage, wherein the cage comprises an internal groove and an internal step, further comprising providing a second fastener and engaging the plug guide and the internal step and disposing the second fastener within the internal groove, the fastener engaging a surface of the plug guide to couple the stem guide to the cage.

21. The method of claim 20, wherein the portion of the cage comprises an outward-facing tapered surface and wherein positioning the compressible ring within the external groove comprises engaging the compressible ring against the outward-facing tapered surface to allow the compressible ring to cooperate with the outward-facing tapered surface to expand the compressible ring.

22. The method of claim 20, wherein the portion of the bonnet comprises an inward-facing tapered surface and wherein positioning the compressible ring within the internal groove of the bonnet comprises engaging the compressible ring against the inward-facing tapered surface to allow the compressible ring to cooperate with the inward-facing tapered surface to compress the compressible ring.

\* \* \* \* \*

UNITED STATES PATENT AND TRADEMARK OFFICE
CERTIFICATE OF CORRECTION

| | |
|---|---|
| PATENT NO. | : 11,041,573 B2 |
| APPLICATION NO. | : 16/406531 |
| DATED | : June 22, 2021 |
| INVENTOR(S) | : Steven K. Hostetter et al. |

It is certified that error appears in the above-identified patent and that said Letters Patent is hereby corrected as shown below:

In the Specification

At Column 2, Line 45, "corporate" should be -- cooperate --.

At Column 6, Line 39, "control valve 200" should be -- control valve 250 --.

At Column 7, Line 1, "bonnet 116" should be -- bonnet 216 --.

Signed and Sealed this
Third Day of September, 2024

Katherine Kelly Vidal
*Director of the United States Patent and Trademark Office*